Fig. 1

INVENTOR.
ORSON W. SMITH

INVENTOR.
ORSON W. SMITH
BY Robinson & Berry
ATTORNEYS

United States Patent Office 3,169,352
Patented Feb. 16, 1965

3,169,352
PANEL SANDING MACHINE
Orson W. Smith, Seattle, Wash., assignor, by mesne assignments, to Smithway Sales Corporation, Seattle, Wash., a corporation of Washington
Filed June 26, 1961, Ser. No. 119,578
13 Claims. (Cl. 51—140)

This invention relates to panel sanding machines. More particularly, it has reference to a high speed high production machine designed for sanding the opposite side surfaces of large sized panels of plywood or the like. The present application is a continuation-in-part and pertains more specifically to novel improvements in the sanding machine of the application of Orson W. Smith, filed Jan. 4, 1960, under Serial No. 250, now abandoned.

It is the principal object of this invention to provide improvements in the machine of the above mentioned application for mounting the panel sanding units; for obtaining a quicker and easier adjustment of the sanding belts and for their easier removal for replacement. Also, to permit easier removal of the sanding units or parts thereof and for the individual removal for repair or replacement of the sanding belt mounting, driving, tensioning and tracking rolls, as now employed in this type of machine.

Another object of the present invention is to provide improved means for adjusting the spacing of the upper and lower sanding units for their finishing of panels of various thicknesses and in means for maintaining the accuracy of the spacing adjustments.

Yet another object of the invention is to provide an improved means for controlling the functional actions of the sanding belt tensioning or tracking rolls as employed in each of the sanding units.

Further objects and advantages of the invention reside in the details of construction and combination of its various parts and in their mode of operation, as will hereinafter be fully described.

In accomplishing the above mentioned and other objects and advantages of the invention, as pointed out in the specification to follow, I have provided the improved details of construction, the preferred forms of which are illustrated in the accompanying drawings, wherein.

Referring more in detail to the drawings:

Briefly described, the sanding machine embodying the improvements of the present invention, comprises separate, vertically spaced housings enclosing, respectively, the "upper" and the "lower" panel sanding units between which the plywood or other panels to be sanded are successively advanced by and between a plurality of paired sets of feed rolls. Each sanding unit comprises a continuous sanding belt that is herein shown to be supported about and driven by three parallel rollers that are operatively supported in what is herein termed a "triangular" arrangement. Each sanding unit, as herein shown, comprises a powered belt driving roll; a belt tensioning and tracking roll, and a contact roll. The powered rolls of the two units are individually motor driven; the sanding belts are held in proper tension by their respective tensioning and contact rolls and the contact rolls are adjustable and serve to retain the sanding belts in proper sanding contact with the panel surfaces as the panels are successively advanced between the upper and lower sanding units.

Associated with the contact roll of each sanding belt is a panel "back-up" roll with mounting and adjusting means whereby the fine adjustments required for sanding the panels to predetermined, precise thicknesses may be obtained. Also, novel means is provided for effecting the spacing of the upper and lower housings which, respectively, mount the paired panel feed rolls in order to accommodate the machine to panels of a wide range of thicknesses.

Other features of the invention, for effecting adjustment and operational control of various parts of the machine will be disclosed and described as the specification progresses.

Referring more in detail to the drawings:

In FIGS. 1, 2, 3 and 4 the present machine has been illustrated as comprising a lower housing section L and an upper housing section T; these sections being of like horizontal dimensions and disposed in vertical alignment and in spaced relationship thus to provide an intervening horizontal space S, adjustable in its vertical dimension for the passing of panels between the sections for sanding.

Figure 1:
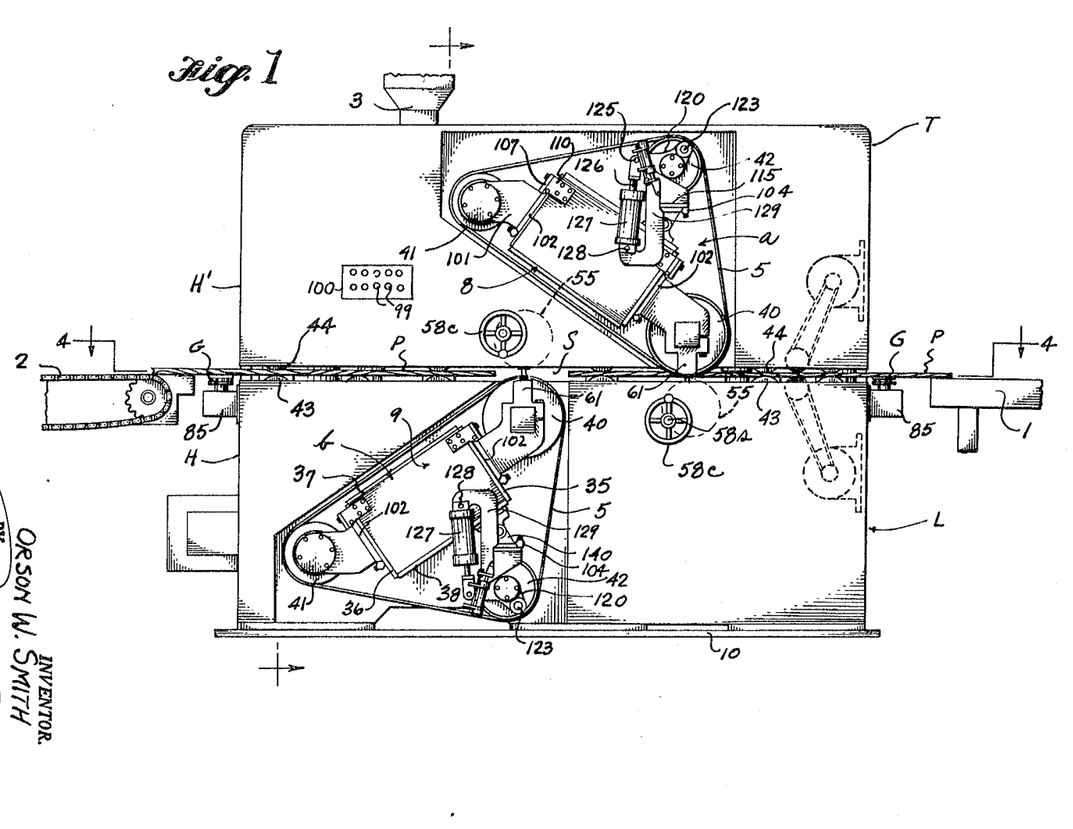
FIG. 1 is a front elevation of the sanding machine embodying the improvements of the present invention therein.

The panels to be sanded are each herein designated by reference character P and it is shown in FIG. 1 that they are adapted to be advanced individually from a feed table 1 at one side of the machine and to be successively discharged from its opposite side onto a suitable supporting or off-bearing means such as a traveling belt 2 as herein shown.

Figure 3:
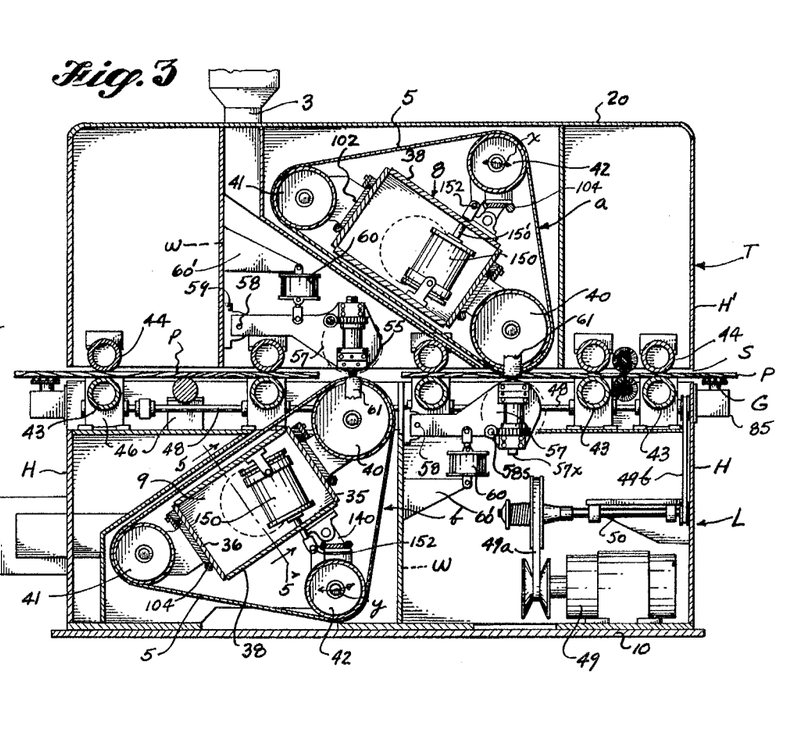
FIG. 3 is a vertical section, taken longitudinally of the machine showing, in particular; the relationship of the upper and lower panel feeding rolls and the relationship of the upper and lower sanding units to the advancing panels.

The mechanism of the upper and lower sections T and L have separate enclosing housings designated respectively in FIG. 3, by reference characters H and H'; the upper housing H' being equipped at the top and at its opposite ends, with suction ducts 3 for drawing off the sander dust therethrough, and the lower housing being equipped with suitably arranged suction ducts for a like purpose.

Figures 2, 2A:
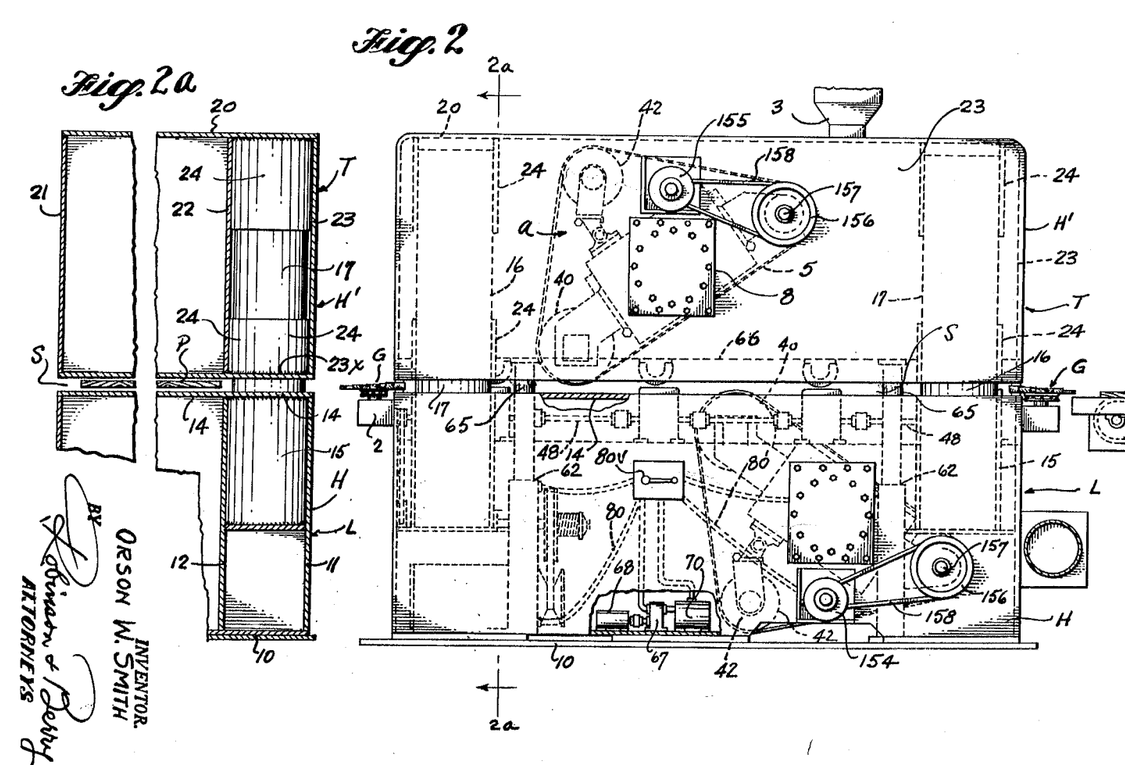
FIG. 2 is a rear or "back end" elevation of the machine showing the disposition of the sanding unit driving motors; the panel moving rollers; the panel thickness gauges and the locations of various other elements of the machine.
FIG. 2a is a cross-section taken on line 2a—2a in FIG. 2, showing the walls of the upper and lower housings.

The two sanding units of the machine, considered in their entireties, are designated, respectively, by reference characters "a" and "b" particularly as outlined within the triangular, dash line showing of the sanding belts in FIGS. 1 and 2. One pair or two pairs of such units in tandem may be employed in a machine as may be found advisable. However, in the present instance only one pair of units is shown with the understanding that additional pairs would be duplicates of the pair shown and could be arranged in tandem therewith.

Figure 4:
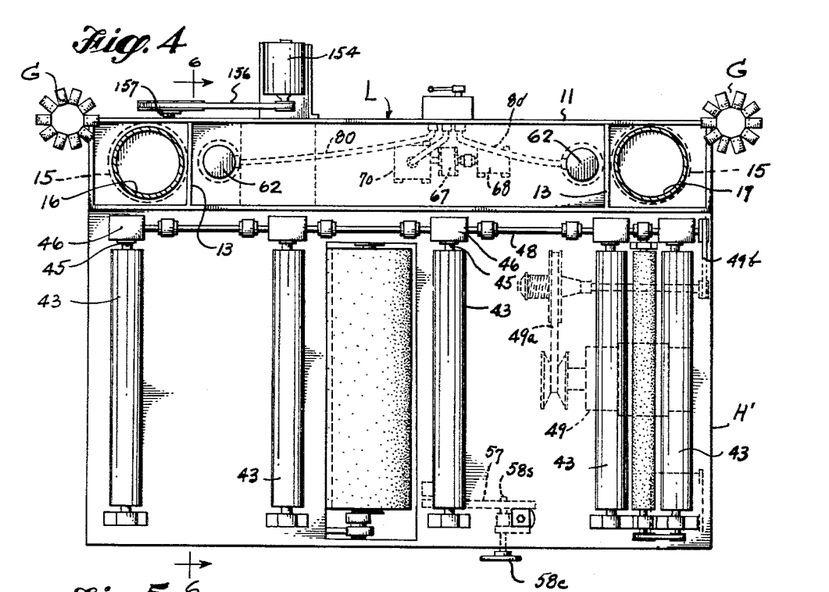
FIG. 4 is a horizontal section, taken on line 4—4 in FIG. 1.
Figure 5:
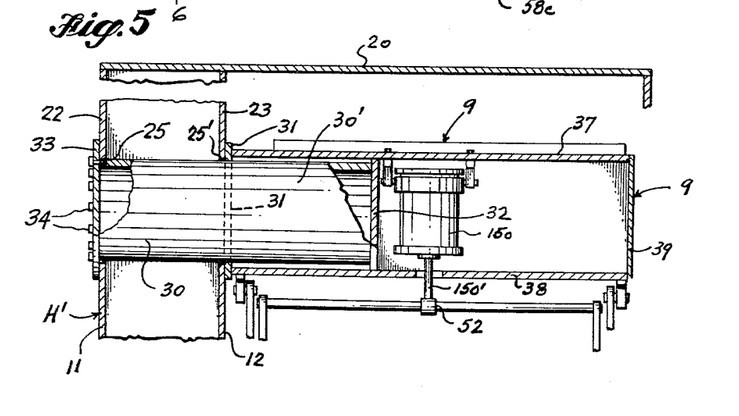
FIG. 5 is an enlarged longitudinal section of the horizontal mounting mast of a sanding unit, particularly showing its mounting stud; this section being taken substantially on line 5—5 in FIG. 3.
Figure 6:
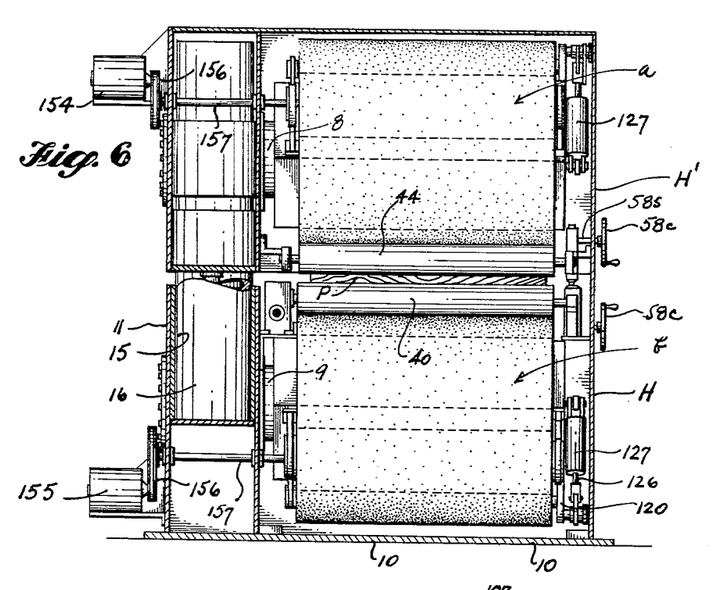
FIG. 6 is a vertical cross-section taken on line 6—6 in FIG. 4.

Each sanding unit, as well shown in FIG. 3, comprises a continuous belt 5 of sand paper, or the like, operable about the three parallel rollers that are supported in what previously was designated as a "triangular" arrangement; these sanding units "a" and "b," respectively, being supported by horizontally extending "masts" 8 and 9 that are constructed and mounted as shown in FIGS. 5 and 6. Each mast is like the other except, as required for the mounting of the units for sanding the upper and lower surfaces of the panels P as passed between them. These two masts are rigidly supported by the "bulkhead" structures that are incorporated in the enclosing frame structures of the housings H and H' of the lower and top sections L and T, as presently explained and which are shown more particularly in FIGS. 4, 5 and 6 to be erected on and to extend along the right hand edge portion of a rectangular, relatively heavy and horizontally disposed base plate 10. The lower bulkhead structure as shown in FIGS. 4 and 6 comprises two laterally spaced and vertically disposed plates 11 and 12 of equal length and height that are welded, on edge, to the base plate 10 and are joined between their ends, in their spaced relationship, by two transverse web plates 13—13, as best shown in FIGS. 4 and 6; each of which web plates 13 is adequately welded along its lower edge to the base plate 10 and along opposite side edges to the side plates 11 and 12. It is also to be observed, by reference to FIGS. 2 and 2a that a cover plate 14 is extended horizontally between the top edges of plates 11 and 12 and is welded thereto.

Disposed between plates 11 and 12 and welded vertically thereto are cylindrical collars 15—15, as shown in FIG. 4. Disposed and fixed in these sleeves are the lower end portions of vertical, tubular columns 16 and 17 which slidably and adjustably support the upper housing section T of the machine thereon, as shown in FIG. 6.

The rigid housing H enclosing the upper section T of the machine is shown in FIGS. 2a and 3 to have a hood-like top or cover plate 20 which, at its left hand end, is closed by a vertical end plate 21, and at its opposite end is similarly closed by a "bulk head" structure comprising complemental laterally spaced, vertical plates 22 and 23. These are disposed in vertical alignment, respectively, with the spaced plates 12 and 11 comprised in the bulk head structure of the lower section L and are welded to the top plate 20. Across their lower edges they are joined by a horizontal plate 23x shown in FIG. 2a. Extending vertically between and welded along their opposite edges to the spaced plates 22 and 23, as in FIG. 2, are cylindrical guides or collars 24 in which the upper end portions of the cylindrical columns 16 and 17 are slidably contained in such manner as to retain the upper housing section T for vertical adjustment from and toward the lower section L as required to accommodate the space S for the passing of panels P of various thicknesses through the machine. Means for effecting the spacing adjustment of the two housings H and H' will presently be described.

Each of the horizontal sanding unit supporting masts 8 and 9, considered in its entirety as seen in FIG. 5, comprises a mounting end member, herein designated as the mast "stud assembly" and the mast proper or "weld assembly" structure that is functionally supported on and by the corresponding stud assembly.

The stud assembly as shown in FIG. 5 comprises a cylindrical, tubular stud forming section comprising an outer mounting end portion 30 and a mast mounting inner end portion 30'. The two mast structures 8 and 9 are alike and the following description of that shown in FIG. 5 will apply equally to the other.

It is to be observed, particularly by reference to FIG. 5, that the lower mast 9 is applied to and is fixed rigidly at its rear or inboard end 30 in the laterally spaced bulk head structure as comprised by the laterally spaced wall plates 11 and 12 of the lower section L. To prepare for so mounting the stud assembly in this bulkhead structure of the machine, the two wall plates 11 and 12 are first formed with horizontally and axially aligned circular openings 25–25' of like diameters into which the cylindrical mounting end portion 30 of the stud assembly is extended from inside the bulkhead and there securely clamped in position as in FIG. 5. The mounting portion 30 has a stop plate 31 of rectangular outline applied thereabout and welded thereto in a plane perpendicular to the stud axis and has an inner end plate 32 similarly applied thereto and welded flatly to its inner end edge. The plate 31 is so positioned as to be flatly engaged against the inside face of bulkhead plate 23 when the stud end 30 is applied as shown in FIG. 5 to the plates 11 and 12. The part 30 has a length that is just slightly short of passing through the plate 11 and a tensioning plate or disk 33 is applied against plate 22 over the outer end of the hole 25 in plate 23 and is drawn tightly against the plate 22 by bolts 34 applied therethrough and into the end of the stud, thus to seat and hold the stud assembly tightly and rigidly in its bulkhead mounting.

The welded assembly structure of mast 9 is of a rectangular box-like formation and extends from plate 31, inwardly and horizontally substantially to the full width of the housing H as shown in FIG. 5.

Figure 7:
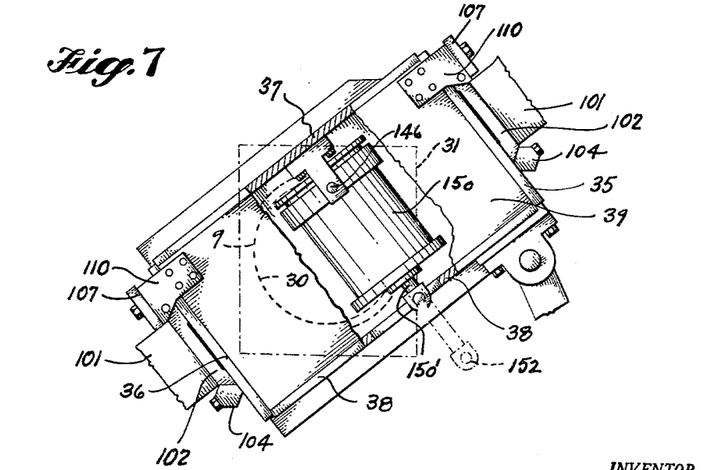
FIG. 7 is an outer or front end view of the horizontal mast of FIG. 5 with parts broken away for explanatory purposes.

It is shown in the end and part cross-sectional view of FIG. 7, that this part of the mast comprises a top wall plate 35; a bottom wall plate 36 and opposite sidewall plates 37 and 38. These plates are applied over the inboard end portion of the mast stud assembly, see FIG. 5, against or across the edges of plates 31 and 32 and are welded thereto and also to each other along their longitudinal edges. At its outer end this box-like mast structure is closed by a flat end plate 39 that is welded therein. Mast 8 is similarly applied to the upper bulk head structure in housing H'.

It is to be understood that the sanding belt 5 of each unit has a width slightly greater than the width of panels P being sanded. Each belt is mounted for travel about three rollers 40, 41 and 42; these being coextensive, in parallel relationship and mounted on the mast in what was previously designated as a triangular relationship and all are functionally mounted on the corresponding mast, as shown in FIG. 3 and as presently described in detail.

It has been shown in FIG. 3 that the mast 9 is disposed with its enclosing side and end wall plates inclined relative to the vertical axial plane of the mast and it is also therein shown that the enclosing wall plates, 35 and 36, respectively, mount the contact and driving rollers 40 and 41 removably thereon by novel means presently to be described, and that sidewall 38 which is farthest from the panel advancing rollers similarly mounts the tracking roll 42 thereon. The sanding belts 5 of the units extend about the corresponding rolls 40, 41 and 42 each to be driven by the corresponding driving roll 41; to be pressed against the faces of advanced panels P by the contact rolls 40 and to be tensioned and given the lateral oscillatory movement in travel by certain movements of the tracking rolls 42.

It has been shown in FIGS. 3 and 6 that the panels P to be sanded are successively advanced horizontally through the machine in space S between the upper and lower housings H and H' by a plurality of parallel, horizontally disposed lower feed rolls 43, shown in FIGS. 3 and 4 to be supported in the same horizontal plane within the top portion of the lower section L. Paired with each feed roll 43 is a pressure roll 44; these latter being mounted in the lower edge portion of the upper section T. All rollers 43 are of like size and are driven in unison and in the same direction by means as shown in FIGS. 2 and 4 to comprise their mounting shafts 45 which are revolubly mounted at their ends in gear housings 46, as in FIGS. 3 and 3a, where each is equipped at one end with a driving gear 47 and all gears 47 are intermeshed with gears 47' on a driven line shaft 48. An electric motor 49 is mounted within the lower bulkhead structure, as shown in FIG. 3 and this has belt driving connections 49a and 49b connected through a transmission shaft 40 with the power shaft 48 which is common to all feed rolls.

Figure 3A:
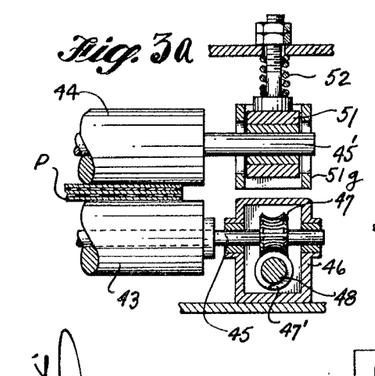
FIG. 3a is a detail showing the relationship of paired panel feed rolls and their driving connections.

The rolls 44, designated as the pressure rolls, have the end portions of their mounting shafts 45' revolubly contained in bearings 51 that are vertically slidably mounted by guides 51g as shown in FIG. 3a, and coil springs 52 act downwardly against the bearings to urge the upper rolls 44 against the top surfaces of the advancing panels P to maintain the panels in frictional contact with the driven lower rolls 43.

Mounted in the machine structure in positions to coact with each of the contact rolls 40 of the sanding units is a back-up roller 55 that is so adjustably mounted as to control the pressure between the sand paper belt in passing over the corresponding conatct roll 40 and panels P as a means of regulating to a fine degree, the final degree, the final thickness of the sanded panels.

Each back-up roll 55, as shown in FIGS. 1 and 3, is coextensive and also parallel with the corresponding contact roll 40 and has a controlled limiting adjustment toward and from the panel surface as it passes between coacting contact and back-up rolls.

Figure 14:
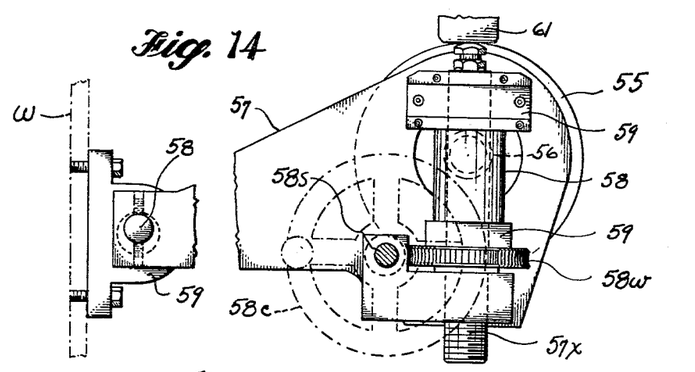
FIG. 14 is a front end elevation of one of the back-up rolls and its mounting and adjusting means.
Figures 15, 16:
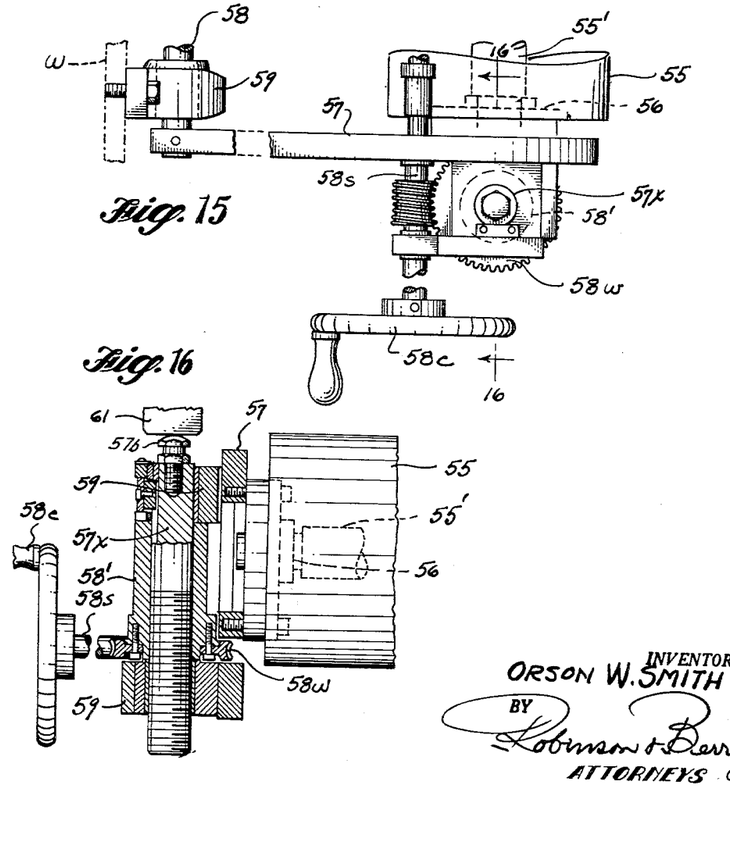
FIG. 15 is a top view of parts shown in FIG. 14.
FIG. 16 is a vertical sectional detail of parts, taken on line 16—16 in FIG. 15.

Each back-up roll 55 has the opposite end portions of its mounting shaft 55' rotatably contained in bearings 56 that are fixed in the swinging ends, as shown in FIGS. 14 and 15, of paired arms 57 that are keyed on the opposite ends of a cross-shaft 58 rotatably mounted near its ends in supporting bearings 59 fixed to a supporting cross-wall w of the corresponding housing H or H', in the manner shown in FIG. 3.

A yieldable pressure is applied against each of the arms 57 by air cylinders 60 supported, as shown in FIG. 3, by brackets 60' extending outwardly from the above mentioned housing wall, thus to maintain a desired pressure by the roller 55 against the panels P in passing. The movement of the roller 55 being adjustably limited by stops in the form of threaded shafts designated by numeral 57x that are vertically supported on the outside faces of the swinging ends of the roller supporting arms 57 as has been shown in FIGS. 3, 14, 15 and 16 and which stops are positioned for end engagement with abutments 61 that are formed as projecting lugs on the end supports of the opposedly related contact roll 40, as has been shown best in FIGS. 1, 3 and 14.

It has been provided that a very fine adjustment of the back-up rolls 55 for sanding each panel P to an exact, predetermined thickness is made possible by extending or retracting the stops 57x as mounted by each of the arms 57 as shown in FIG. 16. Each stop shaft 57x is mounted by and is keyed against rotation between vertically spaced bearings 59—59 that are fixed to the outer face of the corresponding arm 57. Gear nuts 58' are threaded into the shafts 57x and are held against endwise travel between the spaced bearings 59—59 and each has a worm wheel 58w fixed thereto for its rotation. A worm shaft 58s extends between the roller supporting arms 57 at ends of the roller and this has worms meshed with the worm wheels 58w at opposite ends of roller 55 for their rotation in unison by hand wheel crank 58c located at one side of the machine, as seen in FIG. 1.

Rotation of the gear nuts 58'—58' effects extension or retraction of the shafts 57x from or against fixed stops and thereby effects a lifting or lowering adjustment of the back-up roller 55 and a subsequent change in the sanding roll 40. By such adjustment of the back-up rolls of the lower and upper sanding units as above described, the approximate thickness of panels may be obtained. However, for a vernier adjustment of the back-up roller, the stop shafts 57x are provided at those ends which are adjacent the opposite contact roller 40, have bolts 57b threaded axially thereinto in positions to engage said fixed stops. This vernier adjustment means is best shown in FIGS. 14 and 16 and the stops 61 are well shown in FIG. 1.

Vertical adjustment of the upper housing section H', on its two supporting columns 15 and 16 relative to the lower section H is effected by a pair of hydraulic jacks 62—62 shown in FIGS. 2 and 4 to be supported in the lower bulkhead structure of housing H. Each jack comprises a vertical cylinder from which a jack shaft 65 extends to engage a stop plate 66 in the upper bulkhead structure of the housing H'.

A pump 67 mounted in the lower bulkhead is operable by motor 68 to deliver a suitable fluid pressure medium into the lower ends of the jack cylinders to effect the simultaneous extending of the jack shaft 65 thus to lift the upper housing H' on columns 15-16 to a desired extent. When hydraulic medium is forced into the lower ends of the jack cylinders to lift the upper housing section H', its contained sanding unit is lifted accordingly. When this pressure medium is released from the jacks the top section T will be lowered accordingly. The hydraulic medium employed is drawn by the pump 67 from a supply tank 70 for forced delivery to the two jacks through pressure lines 80—80, and the system is suitably valved as at 80v in FIG. 2 to permit draining the pressure medium back to the storage tank 70 for controlled lowering of the jacks. Any desired adjustment thus made in the spacing of housings H and H' can be positively retained by the means next to be described.

Mounted on opposite end walls of the bulkhead structure of the lower housing H are what are herein designated as the "thickness gauge assemblies." In FIGS. 2 and 4, these assemblies are designated in their entireties, respectively, by reference characters G and G; one assembly being shown in detail in FIGS. 10, 11, 12 and 13, to comprise an enclosing box-like housing 85 having a top plate 85' rotatably mounting a vertical shaft 86 therein. At its upper end this shaft horizontally mounts a disk or table 87 and at its lower end mounts a radial arm 88 that is equipped at its outer end with a pair of metal circuit carrying brushes 89-89' that are adapted, as the shaft is rotated, to successively engage paired electrical contacts 90-90' arranged about the axial center of a horizontal disk 91 of an electrically non-conductive material, such as hard rubber, or plastic, that is fixed concentrically of the axis of shaft 86 to the bottom wall 85b of the housing 85.

Figure 12:
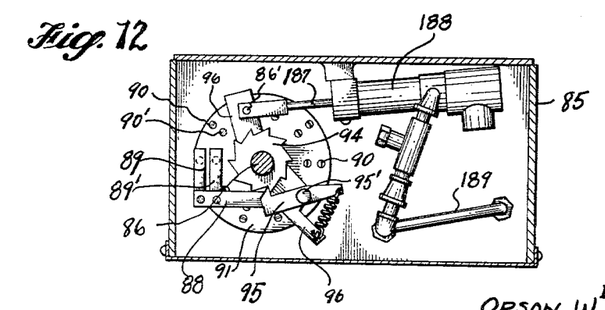
FIG. 12 is a horizontal section taken on line 12—12 in FIG. 11.

Between the ends of shaft 86, a brake hub 92 is keyed and to this hub a pair of brake blocks 93—93 are fitted and yieldingly engaged. Immediately below the brake hub 92 a ratchet wheel 94 is keyed on the shaft. This wheel is adapted to be rotatably advanced to turn the shaft accordingly, by a pawl 95 that is pivoted as at 95' on one end of a cross-arm 96 that is rotatably mounted between its ends on the shaft 86 and is operatively connected at its other end as at 86' to the outer end of a piston rod 187 that extends from an air cylinder 188 mounted in housing 85. The piston rod is operable by air delivered to the cylinder through an air supply line 189 as shown in FIG. 12 to effect actuation of arm 96 for the rotative adjustment of the ratchet wheel, to selected positions under push button control.

The disk 87, fixed on the upper end of shaft 86 is equipped at regular intervals of angular spacing with radially directed spacer blocks 97 which may, by rotative adjustments of the disk 87 be brought successively into position between the adjacent horizontal surfaces of the housing H and H' between which the panels P are advanced, thus to establish their minimum spacing in accordance with the thickness of the selected blocks.

The extent of rotation of the disk 87 is effected by push button controls 99 on a panel 100 mounted conveniently on the front wall of the upper housing H'.

When it is desired to effect a change in spacing of the housings, the operator first sets the hydraulic pump 67 in operation to deliver pressure medium into the jacks to lift the upper housing H' a distance sufficient to clear the spacer blocks that are to be used. He then causes the shaft 86 to be energized and rotated by the action of the air cylinder 188 to dispose the spacer blocks of selected thickness on the disks 87 at opposite ends of the machine, between edges of the spaced sections H and H'. Then the upper section H' is allowed to lower to rest on the selected blocks. This definitely establishes the spacing of the housings.

Figure 18:
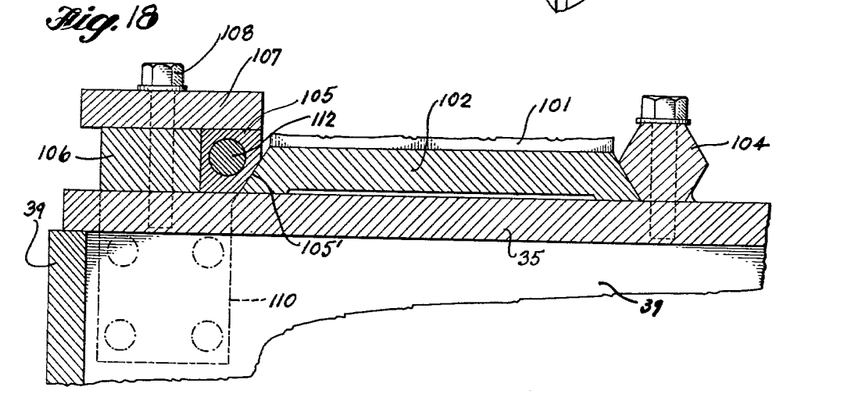
FIG. 18 is an enlarged cross-section, taken on line 18—18 in FIG. 17.

It is to be observed and understood, particularly by the showing of parts in FIGS. 1, 3 and 7, that the three rolls 40, 41 and 42, of each of the sanding units are individually removably mounted on the "weld section" of their corresponding horizontal supporting masts. The contact roll 40 of each unit has a mounting shaft 40x revolubly contained at its ends in bearings provided in supporting standards 101—101 fixed on opposite ends of a flat base plate 102 that is applied flatly against wall plate 35 of the supporting mast. Opposite longitudinal edges of plates 102 are beveled at a 60° angle to holdingly engage, respectively, in sliding, dove-tailed joints with the correspondingly beveled face of a hexagonal bar 104 that is rigidly fixed to plate 35, lengthwise of the mast and with a beveled edge surface 105' of a gib 105, see FIG. 18, that is slidably retained for endwise adjustment in a guideway therefor provided by a backing bar 106 that is bolted or otherwise fixed on plate 35, in a position parallel with hexagonal bar 104 and which is overlaid by a flat bar 107 to provide the top of the guideway; the parts 104 and 105 being secured in position by a succession of bolts 108 applied therethrough and threaded into plate 35, as best shown in FIG. 18. It is also shown in FIG. 18 that the beveled edges of plate 102 are engaged with and clamped beneath the beveled edges of hexagonal bar 104 and gib 105. The gib is longitudinally tapered, as shown in FIG. 18 and when adjusted endwise inwardly, it coacts with the backing bar 106 and bar 107 to securely clamp and hold the plate 102 against endwise movement. By shifting the tapered gib outwardly, its wedging effect will be relieved and the roller mounting plate 102 and roller 40 as mounted thereon are then removable outwardly along and from the supporting mast and from the machine if this is desired.

Figure 17:
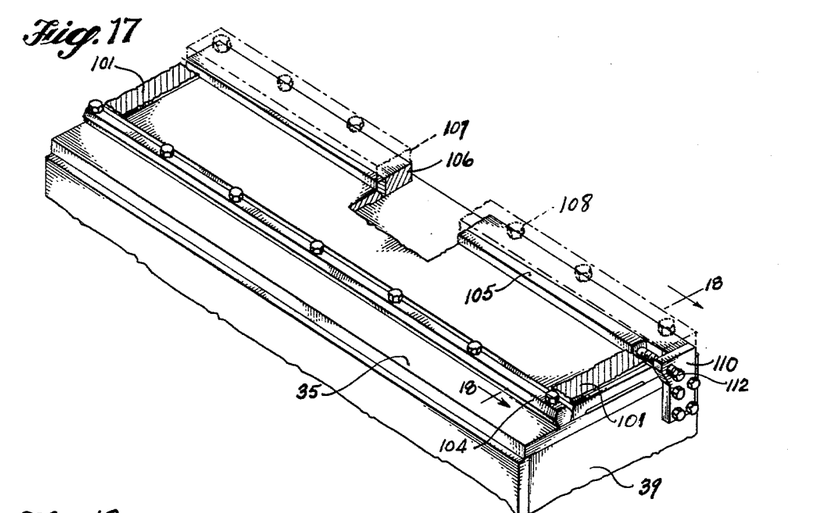
FIG. 17 is a perspective view, partly in section, of a locking gib and associated parts as used in connection with mast supported rollers.

After the plate 102 has been slid into position on the mast, and clamped by the gib 105 the gib is held against any possible releasing movement by a plate 110, see FIG. 17, that is applied flatly against the outer end plate 39 of the mast and bolted thereto with its end portion overlapped with the end of the gib and the gib guide forming bars as has been shown in FIGS. 7 and 17 wherein it is observed that the larger end of the tapered gib terminates adjacent the plate 110.

Figure 19:
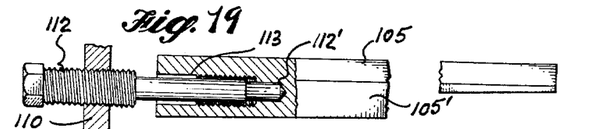
FIG. 19 is a sectional detail of the gib adjusting screw, as used for tightening the gib.

To individually tighten the gibs 105 as applied to the masts to secure the roller mounting plates 102 against endwise movement, tightening bolts 112 are threaded inwardly through the plates 110 as shown in FIG. 19. Each bolt 112 has a diametrically reduced inner end portion 112' extending into and seated against the base of a socket 113 formed in the gib. By threading the bolts inwardly in their mounting plates the gib will be forced inwardly to produce its wedging effect.

Figure 20:
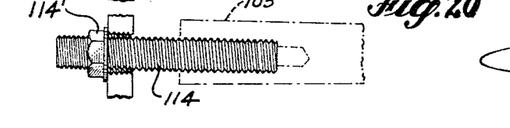
FIG. 20 is a view showing the use of a bolt for loosening the gib.

To loosen the gib, thus to release the plate 102 for removal, it is pulled outwardly; this being effected by replacing bolt 112 with a bolt 114 that is threaded into socket 113 and which has a nut 114' threaded onto its outer end and adapted to be tightened against plate 110 to pull the gib outwardly and thus loosen it so that it may be pulled directly from the mast with and upon detachment of plate 110; this being as illustrated in FIG. 20.

In the same manner as above described, in reference to roll 40, the belt mounting rolls 41 are removably mounted on the side plates 36 of their respective masts and the tracking rollers are removably mounted on base plates 115 as supported from the wall plates 38 of the masts.

Figures 8, 9:
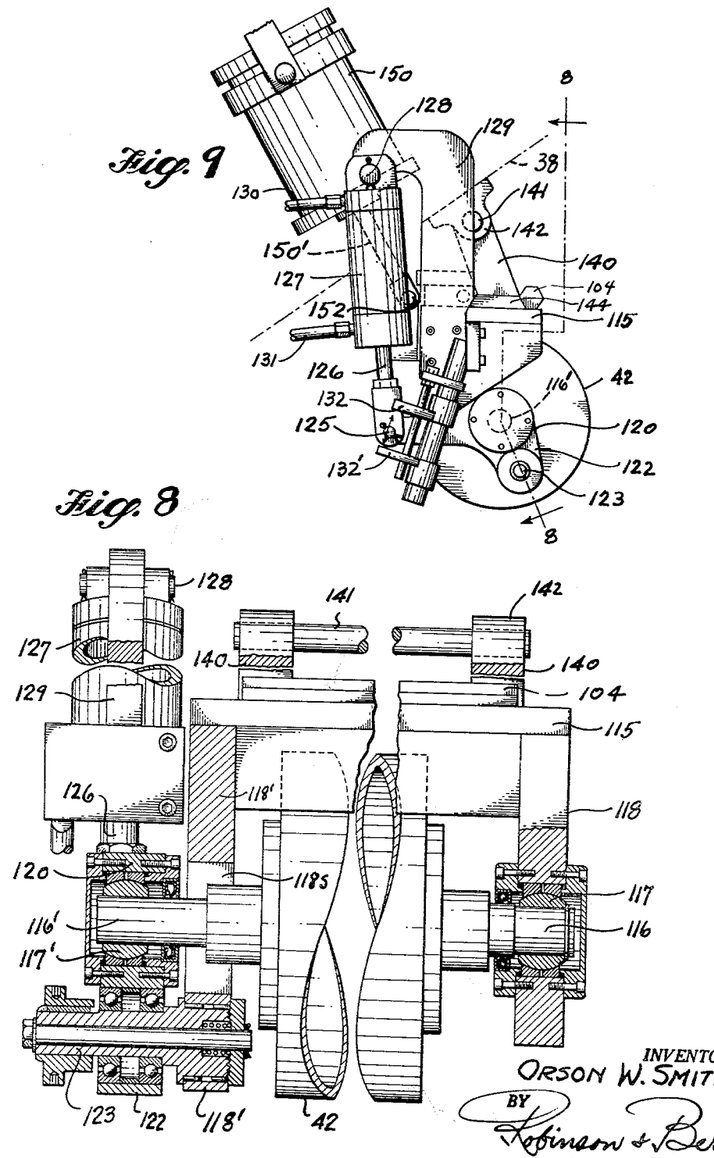
FIG. 8 is a longitudinal section of the adjustably mounted sanding belt tracking roll of one of the sanding units, with the medial portion broken out to shorten the view.
FIG. 9 is a front end elevation of the shaft tracking roller of FIG. 8 and its adjusting means.
Figures 10, 11, 13:
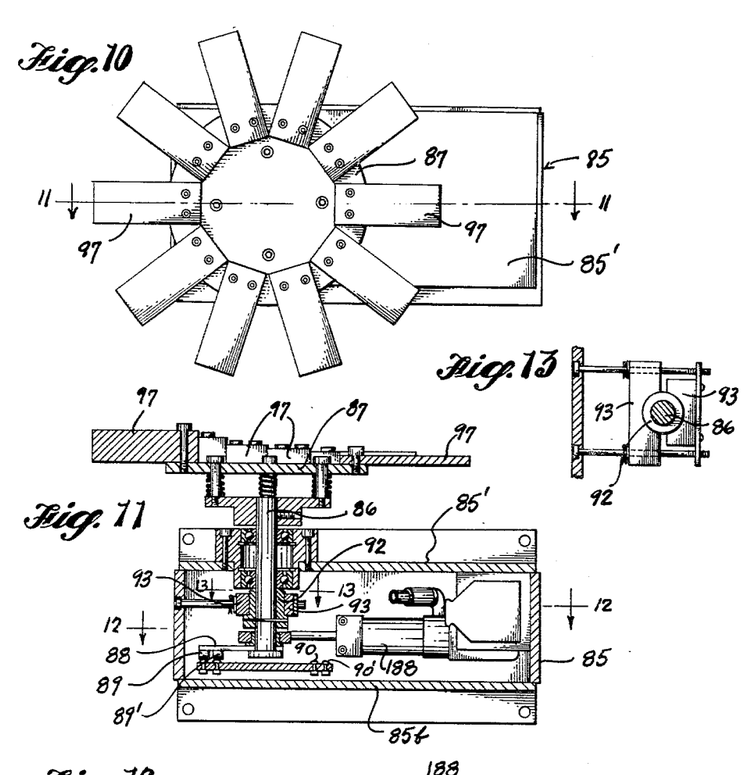
FIG. 10 is a plan or top view of one of the panel thickness gauge assemblies.
FIG. 11 is a vertical section of one of the panel thickness gauge assemblies, taken on line 11—11 in FIG. 10.
FIG. 13 is a horizontal sectional view through the braking means shown in FIG. 11, taken on line 13—13.

The tracking roller 42 of the two units are each supported, as shown in FIGS. 8 and 9 by trunnions 116–116' at their ends that are revolubly contained in ball and socket bearings 117 and 117'. Bearing 117 is mounted in a supporting bracket 118 extended from one end of a base plate 115. The bearing 117' at its other end is revolubly contained in a lever arm 120 of a bell crank formation that has a downwardly directed arm 122 that is pivotally mounted at its end on a stub shaft 123 that extends outwardly from the lower end of a bracket 118' that is paired with bracket 118 and which, as shown in FIG. 8 is slotted as at 118S for the passage of trunnion 116' therethrough to permit movement of the roller under influence of the bell crank lever arm 120 as presently explained. It is shown in FIG. 9 that the outer end of bell crank 120 is pivotally connected as at 125 with a piston rod 126 that extends downwardly from an air cylinder 127 that is pivotally supported at its upper end as at 128 from a bracket 129 that extends from the part 118'.

By the means above described it is made possible to cause the tracking rollers to oscillate in their bearings 117–117' in such manner as to cause the sanding belts to move back and forth thereon to limited extent to avoid any longitudinal scoring of the panels. The extent of oscillation is controlled by limiting the extent of oscillation of the bell crank lever arms 120 by the piston rods 126. Piston rod movement is effected by an alternate admittance of air under pressure into and from the opposite ends of the air cylinders 127 through supply lines 130–131 leading to the cylinder as shown in FIG. 9 from a source of supply of air under pressure. Piston rod movement is limited by adjustably spaced stops 132–132' as shown in FIG. 9.

In order to keep the sanding belts 5 under desired tension, the tracking rolls 42 mounted on their supporting plates 115 as shown in FIGS. 8 and 9 have limited swinging movements as indicated by the arcuate arrows X and Y shown thereon in FIG. 3. It is also to be observed by reference to FIGS. 3 and 9 that the roll mounting plates 115 are in turn mounted at their ends by supporting arms 140—140 which are pivotally supported on a shaft 141 carried at its ends in bearings 142 fixed to the mast side plate 38.

It is further to be explained that the mounting plate 115 for roll 42, as seen in FIGS. 8 and 9, is attached to the pivoted arms 140—140 through the mediacy of a flat plate 144 with beveled longitudinal edges at opposite sides which engage respectively, with a hexagonal bolt 104 and a gib applied to parts secured to plate 115 in the same manner as shown for the releasable securement of plates 102 to the mast in FIG. 7. Therefore, the tracking roll, like rolls 40 and 41, is removable from the mast if such is desired.

Contained in each mast medially of its ends and pivoted at its outer end to mast wall plate 37 as at 146 in FIG. 7 is an air cylinder 150 with piston rod 150' extended from its opposite end to and pivotally attached as at 152 to the roll mounting plate 115 as shown best in FIG. 3. Air pressure applied to the cylinder 150 at its outer end wall operates to extend the piston rod 150' to rock the mounting means of the tracking roller to cause it to apply more or less belt tensioning force.

The driving of the sanding belts 5 and 5 of the two units is effected by driving their corresponding rolls 41. This is accomplished by individual electric motors 154 and 155 that are mounted on the back side of the machine as shown in FIGS. 2 and 6 wherein it is seen that belt wheels 156 are applied to the extended ends of the roll mounting shafts 157 and belts 158 operate about belt wheels 156 and belt wheels on the motor shafts.

In summarizing it is desired to emphasize the following improvements:

1st—The provision of means for retaining any set adjustment in spacing of the upper and lower housings of the machine, as established by the hydraulic jacks, to accommodate panels of different thicknesses. This adjustment being retained through the mediacy of the two units designated by reference characters G and G, illustrated in construction in FIGS. 10 through 13.

2nd—The provision for the sanding belt tensioning and tracking means as disclosed in FIGS. 8 and 9, characterized by the ball and socket bearings 117—117 in which the end trunnions of the tracking roller mounting shaft are rotatably contained, and the air cylinders 127 whereby tracking effecting oscillation of the roller 41 is effected and the air cylinder 150 whereby belt tension is adjusted and maintained.

3rd—In the provision for effecting the adjustment of the back-up rolls 55 for the establishment of the sanding depth of the belts 5 in their contact with the panels as accomplished by the adjustable stops best shown in FIGS. 14, 15, and 16 in which the micrometer adjustment as obtained by the bolts applied to the ends of threaded shafts 57x to engage the stops or abutments 61.

4th—The improvement in the construction of the sanding unit mounting masts 8 and 9 and the provision of mounting means for the belt carrying rollers 40, 41 and 42 which provides for individual removal of any roller from the mast for repair, replacement or adjustment; this structure being featured in part by the use of the gibs 105 as shown in FIGS. 17 through 20, and the gib tightening and releasing means shown therein.

What I claim as new is:

1. A panel sanding machine comprising spaced upper and lower housings for the delivery of panels between them for sanding, a sanding unit mounted in each of said housings, in spaced longitudinal relationship, means for adjusting the vertical spacing between said sanding units to accommodate the sanding units to panels of different thicknesses, panel backup means associated and vertically aligned with each sanding unit and adjustable relative thereto to establish the surface sanding depth of the corresponding unit, a plurality of pairs of panel feed rolls between which the panels are successively delivered for advancement between the sanding units and means for adjusting the paired feed rolls to accommodate them for the advancement of panels of different thickness.

2. A panel sanding machine as in claim 1 including a horizontal mast secured in each housing and extending transversely between opposite sides of said machine, said sanding units being respectively mounted on said masts, each sanding unit including a plurality of coextensive, sanding belt mounting elements arranged in triangular relationship about and parallel with the axial line of its supporting mast, and an endless sanding belt mounted for travel about said elements of each unit; one of said elements of each unit being a belt driving roll, another being an adjustable belt tensioning roll and another being a belt guide that is adjustable to press the driven belt into sanding contact with the adjacent surface of each panel as advanced through the machine.

3. A panel sanding machine according to claim 2 wherein each mast mounts the belt mounting elements for endwise, sliding removal therefrom.

4. A panel sanding machine according to claim 2 wherein each mast is of rectangular cross-section and is formed by flat wall plates, joined rigidly in edge to edge connection, and wherein at least one of said sanding belt mounting elements of said units is mounted on a base plate that is applied flatly to one of said wall plates of the mast between holding guides for its endwise movement onto or from the mast.

5. The panel sanding machine as in claim 4 wherein said base plate has parallel longitudinal edges that are beveled and adapted to slidably engage in dove-tailed connections with similarly beveled guides that are secured to a wall plate of the mast and means for removably retaining the base plate in secured relationship between said guides.

6. A panel sanding machine according to claim 2 including a tracking mechanism operable to cause a predetermined oscillating action of the belt tensioning roll to cause a limited back and forth shifting of the sanding belt thereon as it travels.

7. A panel sanding means according to claim 6 wherein said belt tensioning and tracking roll is supported for belt tensioning adjustment and is movable by the action of the piston of a pressure cylinder for regulating belt tension.

8. A panel sanding machine according to claim 6 including an air cylinder with a piston rod that is connected with the mounting means for said tensioning roll at one end thereof and is operable by the air cylinder to effect the oscillating movement of the roll for belt shifting.

9. A panel sanding machine according to claim 2 including an air cylinder with its piston rod connected with the mounting means for said tensioning roll at one end thereof and operable to effect a rocking oscillating movement of the belt tensioning roll, and wherein the application of operating air is alternately to opposite ends of said air cylinder under control of and in accordance with the lateral shifting of the sanding belt on said tracking roll.

10. In a sanding machine of the character disclosed; means for advancing panels for sanding successively through the machine, a sanding belt operable about a contact roll and positioned by said roll for sanding the adjacent surface of the panels as passed through the machine, a back-up roll positioned to support the panels in passing and engageable with the panels opposite the sanding line of the belt, means for adjusting the back-up roll from and toward the panels to determine the sanding depth of the belt; said means including adjustable supporting means for the back-up roll at its opposite ends and stops against which said supports are engageable to establish the position of each panel and the sanding depth of the belt.

11. The combination recited in claim 10 wherein said adjustable supporting means for the back-up roll are equipped with extendable and retractable shafts to vary their effective lengths and to engage the stops for obtaining fine adjustments of the sanding depth of the belts.

12. A sanding machine as in claim 10 wherein said stops are provided on the ends of the opposedly related contact roll.

13. A sanding machine as in claim 10 wherein said back-up roll is mounted on pivotal arms and pressure cylinders are secured to the arms for adjusting said back-up roll from or toward the panels.

References Cited by the Examiner

UNITED STATES PATENTS

| | | | |
|---|---|---|---|
| 1,356,338 | 10/20 | Clarke | 57—148 |
| 2,470,615 | 5/49 | Grover | 51—135 |
| 2,572,374 | 10/51 | Oas et al. | 51—139 |
| 2,597,256 | 5/52 | Murray | 51—135 |
| 2,722,786 | 11/55 | Carlson | 51—141 |

FOREIGN PATENTS 1,017,936  10/57  Germany.

LESTER M. SWINGLE, *Primary Examiner.*

FRANK H. BRONAUGH, *Examiner.*